United States Patent [19]

De Feo

[11] 4,287,156
[45] Sep. 1, 1981

[54] FLUIDIZED BED REACTOR
[75] Inventor: Angelo De Feo, Totowa Boro, N.J.
[73] Assignee: Curtiss-Wright Corporation, Wood-Ridge, N.J.
[21] Appl. No.: 151,385
[22] Filed: May 19, 1980
[51] Int. Cl.³ .................. B01J 8/08; F27B 15/08; F27B 15/10; F27B 15/16
[52] U.S. Cl. ............................. 422/143; 34/57 A; 110/245; 165/104.16; 422/145; 422/146; 431/7; 431/170
[58] Field of Search ............ 34/57 A; 165/104 F; 431/7, 170; 110/245; 422/143, 145, 146; 201/31; 48/210

[56] References Cited

U.S. PATENT DOCUMENTS

| 3,687,115 | 8/1972 | Bell | 122/7 R X |
| 3,982,901 | 9/1976 | Steever et al. | 165/104 F X |

FOREIGN PATENT DOCUMENTS

| 866481 | 4/1961 | United Kingdom | 165/104 F |
| 270697 | 8/1970 | U.S.S.R. | 422/146 |

*Primary Examiner*—Barry Richman
*Attorney, Agent, or Firm*—Arthur L. Frederick

[57] ABSTRACT

An improved fluidized bed reactor of the type having dual shells spaced apart to define a gaseous fluid inlet passageway which is in communication with a source of gaseous fluid and a gaseous fluid distribution partition to form within the inner shell a reaction zone and having a heat exchange unit in the reaction zone for temperature control. The improvement comprises two manifolds which are disposed adjacent the gaseous fluid distribution partition and each in communication with the inlet passageway to receive gaseous fluid from the latter. One manifold communicates with the distribution partition passages while the other manifold communicates with the heat exchange unit. A valve means is disposed within the reactor for controlling flow of gaseous fluid from the inlet passageway to provide flow of one portion of the gaseous fluid to one manifold for passage, through the distribution partition, into the reaction zone for fluidization and another portion of the gaseous fluid flow to the other manifold for passage into the heat exchanger and control of the temperature in the reaction zone.

15 Claims, 4 Drawing Figures

FLUIDIZED BED REACTOR

This invention relates to fluidized bed reactors and more particularly to fluidized bed reactors of the type having inner and outer shells spaced apart to define therebetween a gaseous fluid inlet passageway and a heat exchanger disposed in the reaction zone of the reactor.

BACKGROUND OF THE INVENTION

In fluidized bed reactors of the aforesaid type, as for example for burning coal under high pressure, there exists the problem of providing inlet and outlet connections which maintain sealing integrity during relative expansion and contraction of the inner and outer shells in both the radial and longitudinal directions. Since the inlet and outlet connections must extend through aligned openings in the inner and outer shells and the inlet passageway the sealing integrity requirement involves the need to maintain the gaseous fluid inlet passageway out of communication with the aligned openings in the inner and outer shells and, hence, the interior of the inner shell and the ambient area outside of the reactor. Another problem in such reactors is the problem of modulating inlet gaseous fluid between the heat exchanger for controlling reaction zone temperature and the reaction zone for fluidization therein. Both these problems are solved by the fluidized bed reactor according to this invention.

Therefore, it is an object of this invention to provide, in a fluidized bed reactor of the type comprising two shells defining therebetween a fluid inlet passageway, inlet and outlet connectors which maintain sealing integrity during relative expansion and contraction of the shells.

It is another object of this invention to provide, in a fluidized bed reactor of the type having spaced telescopically arranged shells which form therebetween a gaseous fluid inlet passageway, for the modulation of gaseous fluid, from the inlet passageway, between a heat exchanger in the reaction zone of the reactor and a fluid distribution means for effecting a fluidization in the reaction zone.

SUMMARY OF THE INVENTION

Accordingly, the present invention contemplates an improved fluidized bed reactor of the type having inner and outer spaced shells to define therebetween a gaseous fluid inlet passageway for receiving and conducting a gaseous fluid, as for example, air, from a source thereof remote from the reactor, and a distribution partition, having a fluid distribution means, which divides the inner shell into a reaction zone and an outlet chamber. The reactor also has a heat exchanger in the reaction zone for conducting gaseous fluid therethrough for the absorption of heat from the reaction zone. Inlet connector means and outlet connector means are also provided in the reactor for respectively passing particulate materials into the reaction zone and for conducting products of the reaction from the reaction zone.

The improvement in this type reactor comprises partition means cooperating with the distribution partition to form first and second inlet manifolds. The first manifold is in communication with the inlet passageway to receive one portion of gaseous fluid therefrom for passage into the reaction zone via the fluid distributing means. The second manifold is in communication with the inlet passageway to receive from the latter another portion of the gaseous fluid from the inlet passageway. A valve means is disposed within the reactor for modulating flow of gaseous fluid from the inlet passageway to the first and second manifolds.

In another aspect of this invention, the improvement comprises the connector members or ducts which include a plurality of circumferentially spaced connectors, each of which extends through aligned openings in the inner and outer shells and wherein each inlet connector has an engaging means for sealingly contacting the inner and outer shells and allowing relative expansion and contraction of the inner and outer shells while maintaining sealing engagement and isolation of the inlet passageway from the associated aligned openings.

A feature of this invention is that each of the connector members comprises a sleeve spanning the annular inlet passageway and extending into aligned openings in the inner and outer shells. The sleeve is sealingly connected to the inner and outer shells by a universal type joint so that the inner and outer shells can move relative to one another while keeping the inlet passageway and aligned openings out of communication with each other. A further feature is that the sleeve is constructed and arranged so that the sleeve may axially move relative to one of the universal joints to allow for relative movement between the inner and outer shell in a direction along aligned axis of the sleeve without disrupting the seal.

BRIEF DESCRIPTION OF THE DRAWINGS

The invention will be more fully understood from the following detailed description thereof when considered in connection with the accompanying drawing in which.

DESCRIPTION OF THE PREFERRED EMBODIMENT

Figure 1:
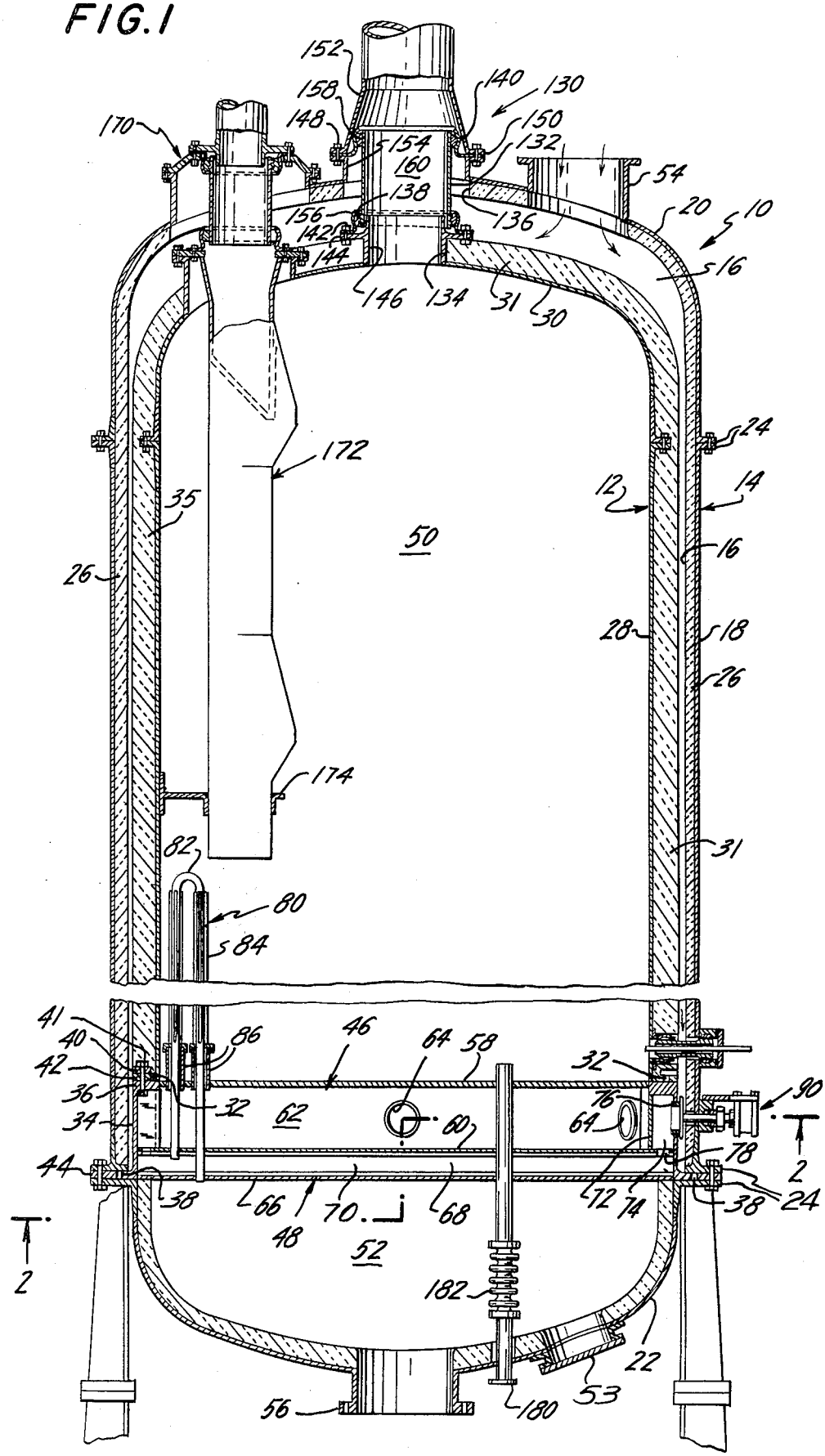
FIG. 1 is a longitudinal cross-sectional view of the reactor according to the invention with parts broken away for illustration purposes only.
Figure 2:
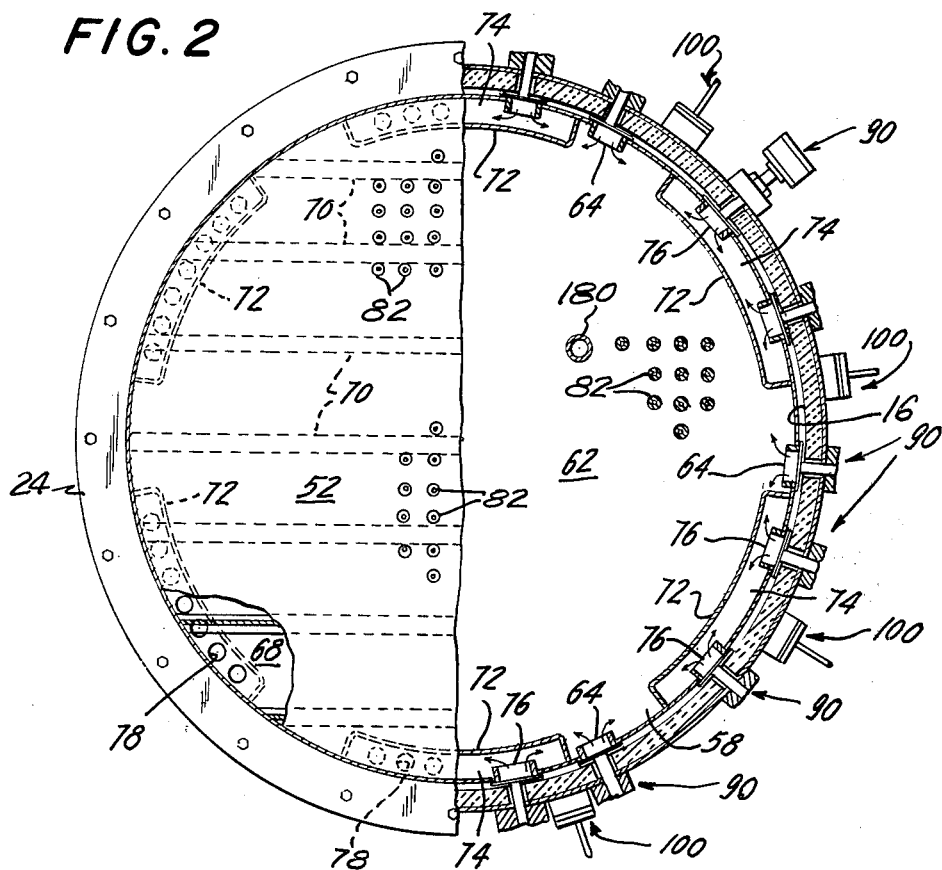
FIG. 2 is a transverse view in cross-section of the reactor taken substantially along line 2—2 of FIG. 1.

Now referring to the drawing and, more particularly to FIGS. 1 and 2, 10 generally designates the fluidized bed reactor according to this invention. The reactor 10 comprises an inner shell 12 and an outer shell 14 which shells are so sized, taking into account the thickness of a layer of heat insulating material that includes the shells, that an inlet passageway 16 is defined therebetween.

The outer shell 14 comprises a metal cylindrical body portion 18 closed at its upper and lower ends by an upper, dome-shaped head portion 20 and a dome-shaped bottom portion 22, respectively. The body portion 18 may be secured to the head portion 20 and bottom portion 22, by bolting at adjacent flanges 24 of those members, or in any other suitable manner, as for example welding. The interior surfaces of body portion 18, head portion 20 and bottom portion 22 of shell 14 are lined with a layer of heat insulating material 26.

The inner shell 12 comprises a cylindrical body portion 28 capped at its upper end by a domed-shaped head portion 30. Similar to outer shell 14, the outer surfaces of body portion 28 and head portion 30 of inner shell 12 are covered by a layer of heat insulating material 31. The lower open end of body portion 28 is provided with an annular flange 32 which rests upon a flanged ring 34. The flanged support ring 34 has an upper flange 36 and a lower flange 38. Clamped between upper flange 36 and a retaining ring 40 by bolts 41, is a ring 42 which has circumferentially spaced notches along its inner periphery. The flange 32 of body portion 28 is provided with circumferentially spaced notches to form lugs which mesh with the notches in ring 42 to position shell 12 and allow it to radially expand and contract relative to flanged support ring 34.

The flanged support ring 34 is connected to outer shell 14 between lower adjacent flanges 24 of the outer shell. Clamped between the lower adjacent flanges 24 is a ring 44, similar to ring 41, which has its inner periphery notched and which meshes with circumferentially spaced lugs formed in the outer periphery of flange 38 of flanged support ring 34. This interdigitated relationship of flange 38 and ring 44 maintains the concentricity of the outer shell 14 and support ring 34 and first and second manifolds 46 and 48 supported thereon while permitting the support ring 34 and manifolds 46 and 48 to radially expand and contract relative to outer shell 14.

The first and second manifolds 46 and 48, part of which includes a partition, divide the reactor into a reaction zone 50 in which a fluidized bed is to be maintained and an outlet chamber 52.

The outer shell 14 is provided with a gaseous fluid inlet connector 54 in the upper head portion 20, which connector is connected by suitable ducts (not shown) to a source (not shown) of gaseous fluid, such as air, which may be pressurized. The outer shell 14 at the bottom portion 22 is provided with an outlet connector 56 which is for connection with ducts for conducting gas fluid from outlet chamber 52 for use or discharge. A covered manhole 53 is also provided in bottom portion 22.

The first manifold 46 comprises an upper plate or partition 58 and a spaced lower plate 60, each of which is secured at its periphery, by welding or in some other suitable manner, to support ring 34, partition 58 and 60 and support ring 34 defining a first inlet chamber 62. As best shown in FIG. 2, first inlet chamber 62 is in communication with inlet passageway 16 via a plurality of circumferentially spaced valve controlled ports 64.

The second manifold comprises partition 60 of the first manifold 46 and a spaced plate or partition 66 which is secured at its periphery, by welding or in some other suitable manner, to support ring 34. The partitions 60 and 66 and support ring 34 define therebetween a second inlet chamber 68. To add rigidity and strength to both the first and second manifolds 46 and 48, a plurality of spaced parallel I-beams 70 are interposed between partitions 60 and 66. Each of the I-beams 70 are secured to the partitions 60 and 66 and to support ring 34 in any suitable manner, as for example by welding.

To provide for conducting gaseous fluid flow into second inlet chamber 68, a plurality of circumferentially spaced walls 72, U-shaped in horizontal cross-section, are disposed in first inlet chamber 62 and are secured in a fluid tight manner, as for example by welding or the like, to support ring 34 and partition 60. These walls 72 define with support ring 34 and partition 60, a plurality of secondary inlet manifolds 74. Each of these inlet manifolds 74 communicates with inlet passageway 16 by way of a pair of valved ports 76, similar to valved ports 64. To communicate each of the secondary inlet manifolds 74 with second inlet chamber 68, a plurality of ports 78 are provided in partition 60.

The reactor 10 is provided with a heat exchanger 80 which comprises a plurality of U-bend tubes 82 (only one of which is shown in FIG. 1) extending into reaction zone 50 and disposed throughout the area of distribution partition 58 as is indicated in FIG. 2. Each tube 82 may have longitudinally extending fins 84. Each of these tubes 82 is supported by partition 58 via tuyeres 86, and communicates at one end with second inlet chamber 68 and, at the opposite end, with outlet chamber 52. Surrounding each leg of the U-bend tubes 82, is a tuyere 86 which communicates with first inlet chamber 62 to receive gaseous fluid from the latter for passage into reaction zone 50. The tuyeres 86 may be of any suitable construction which is capable of distributing the gaseous fluid in first inlet chamber 62 into reaction zone 50 for the purpose of creating and maintaining a fluidized bed of particulate solids in the reaction zone and, in the case of the combustion of fuel, provide also the oxygen for the support of combustion. In the alternative, without departure from the scope and spirit of this invention, the heat exchanger 80 may be made of straight telescopically arranged tubes as disclosed in applicant's co-pending U.S. patent application Ser. No. 062,746, filed Aug. 1, 1979, and may have separate tuyeres of the type disclosed in the aforesaid co-pending patent application. The function of the heat exchanger 80 is to remove heat from the reaction zone 50 so that the reaction temperature within that zone is maintained within certain predetermined limits, as for example, in a coal burning reactor of a temperature between 1550° F. and 1750° F. To control the gaseous fluid flow to heat exchanger 80 and into reaction zone 50, via tuyeres 86, a valve means according to this invention is provided to modulate gaseous fluid flow from inlet passage 16, through ports 64 and 78, into first and second inlet chambers 62 and 68.

Figure 3:
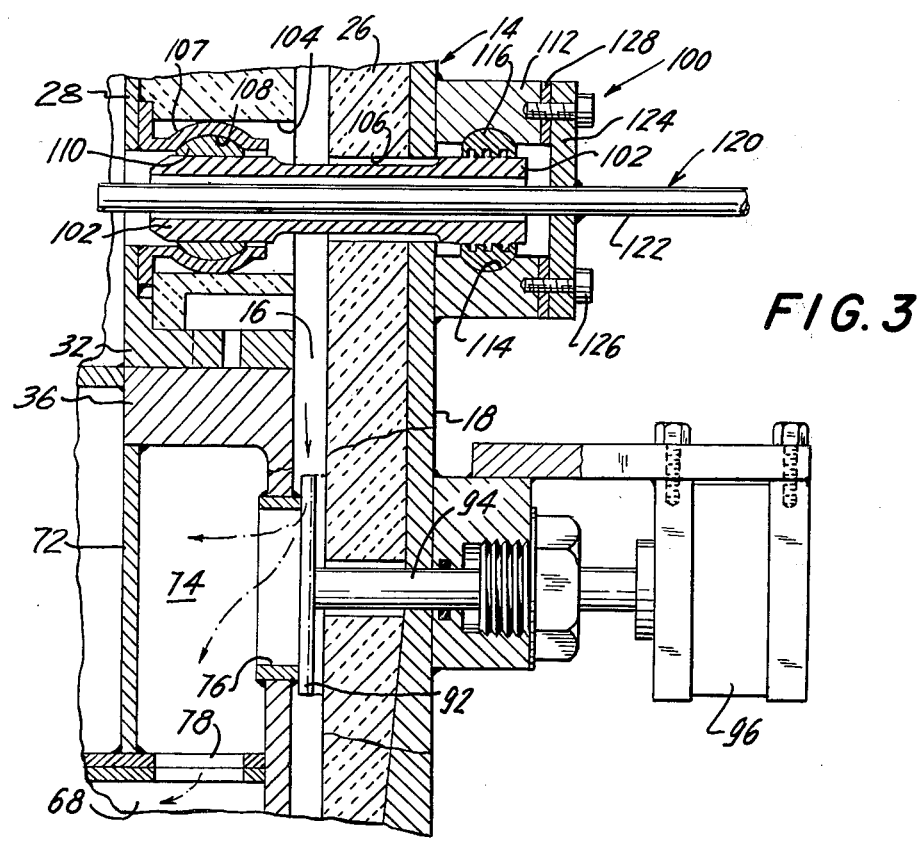
FIG. 3 is an enlarged fragmentary view of the valve and an inlet connector shown in FIG. 1.

The valve means comprises a valve assembly 90 for each of the ports 64 and 74 mounted on outer shell 14. Each valve assembly 90, as best shown in FIG. 3, has a movable valve head 92 which is supported on one end of reciprocably movable valve stem 94. The valve stem 94 is connected to a suitable actuator means 96 for effecting reciprocative linear movement of valve stem 94 and hence valve head 92 toward and away from a seated position against port 64 or 76. Any suitable control means (not shown) for coordinated movement of valve assemblies 90 is provided to modulate flow of gaseous fluid from inlet passageway 16 into first and second inlet chambers 62 and 68.

The introduction of particulate solid material, such as coal and/or dolomite into reaction zone 50, is achieved by a plurality of circumferentially spaced inlet connector members 100. As best shown in FIG. 3, each inlet connector member 100 comprises a sleeve 102 which projects into aligned openings 104 and 106 in the respective inner and outer shells 12 and 14, and spans inlet passageway 16. Within opening 104 and surrounding the adjacent end portion of sleeve 102, is a socket sleeve 107 which is attached at a flanged end portion, by welding or other suitable means, to body portion 28 of inner shell 12. The socket sleeve 107 has an annular, concave recess 108 which receives therein a collar or ring 110. The ring 110 is slidably supported on sleeve 102 and has an outer peripheral surface which is generally convex in cross-section and is complementary to and sealingly abuts recess 108. A socket sleeve member 112 is secured to body portion 18 of outer shell 14 to surround the adjacent end portion of sleeve 102. Similar to socket sleeve 107, socket sleeve 112 has an annular, concave recess 114 which is adapted to receive in abutting relation the complementary outer peripheral surface of a collar or ring 116. The ring 116 is fixedly secured to sleeve 102 in any suitable manner, such as by brazing, swaging, rolling, soldering or welding or the like. An injector 120, which comprises, in part, a tubular member 122 secured to a mounting plate 124, is attached to socket sleeve 112 by hold-down bolts 126 so that tubular member 122 extends coaxially through sleeve 102 and projects into reaction zone 50. To seal the area of attachment, a gasket 128 is disposed and clamped between mounting plate 124 and socket sleeve 112.

Each of the connector members 100, function to prevent gaseous fluid in inlet passageway 16 from flowing through aligned openings 104 and 106 and into reaction zone 50 or escaping outside of reactor 10 and, at the same time, maintains a seal upon relative movement, both in a radial as well as a longitudinal direction, between the inner and outer shells 12 and 14. The rotative movement of rings 110 and 116 in their respective recesses 108 and 114 compensates for the relative longitudinal movement between the inner and outer shells and the sliding movement of ring 110 along sleeve 102 compensates for the relative radial movement between the inner and outer shells. Thus, no gaseous fluid is permitted to bypass ports 64 and 76 in spite of longitudinal and radial relative movement of the inner and outer shells of the reactor and the necessity for piercing the shells for the introduction of particulate solid into the reaction zone 50.

Figure 4:
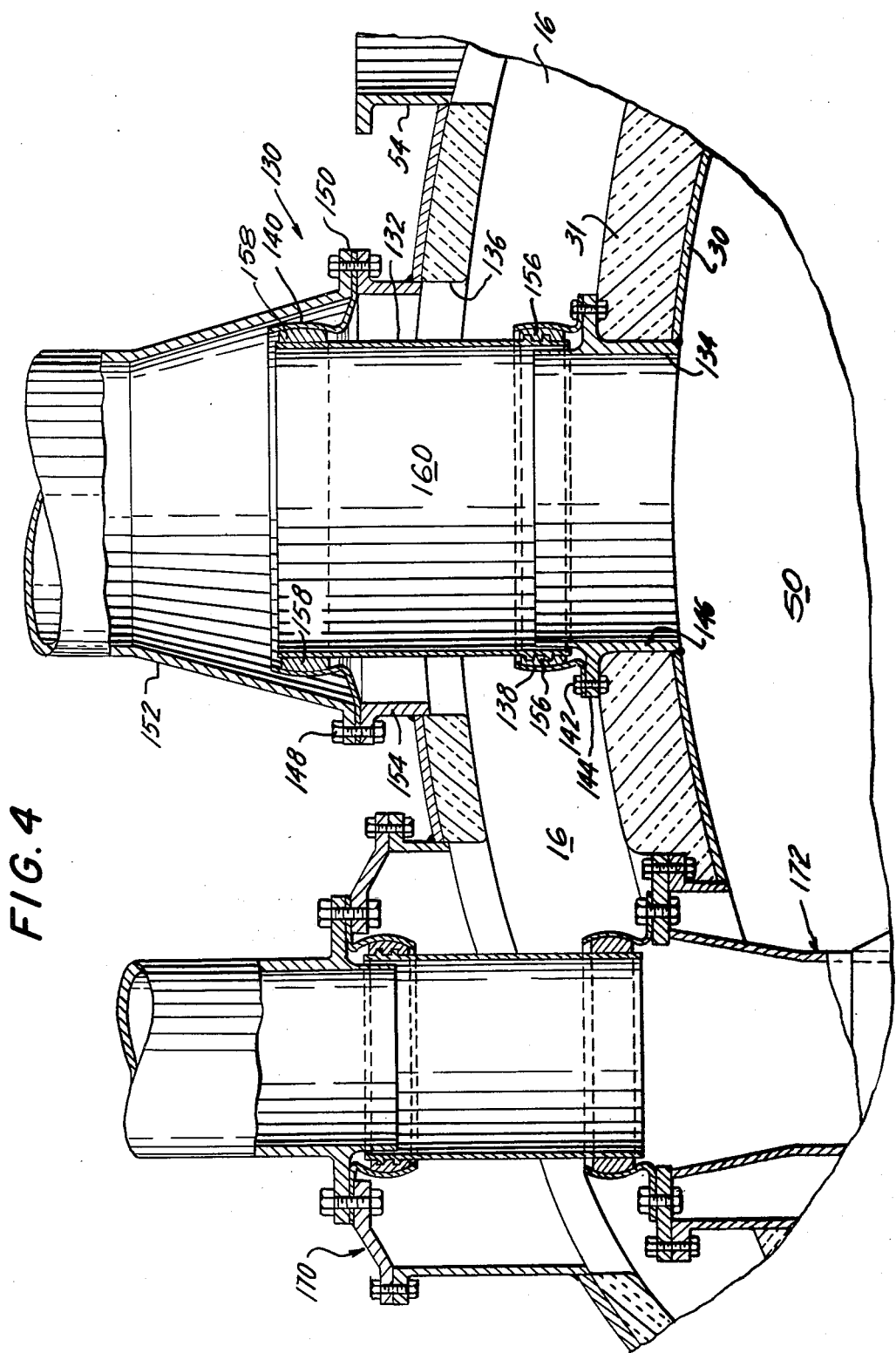
FIG. 4 is an enlarged fragmentary view of the conduit connectors shown in FIG. 1.

As best shown in FIG. 4, the gaseous products of the reaction in reaction time 50 are conducted from the reactor 10 via a conduit connector 130 according to this invention. The conduit connector 130 comprises a duct or sleeve 132 which is supported coaxially to aligned openings 134 and 136 in the head portions 30 and 20 of inner and outer shells 12 and 14 by socket sleeve members 138 and 140 respectively. The socket sleeve member 138 is connected by bolts 142 to an annular flange 144 of a sleeve 146 which lines opening 134 and is attached to head portion 30 of inner shell. The socket sleeve member 140 is clamped by bolts 148 between the flanged end 150 of a bell-mouth duct 152 and the flanged end of a duct 154 connected within opening 136 to head portion 120 of outer shell 14. The sleeve 132 has secured at one end portion thereof a collar or ring 156. The ring 156 has an annular outer peripheral surface which is arcuate shaped in cross-section and which is complementary to and sealingly abuts a surface of an annular recess formed in socket sleeve member 138. Adjacent the opposite end portion of sleeve 132 is another collar or ring 158 which surrounds the sleeve and is slidable axially relative to the sleeve. The ring 158, similar to ring 156, has an annular outer peripheral surface which is arcuate shaped in cross-section and which is complementary to and sealingly abuts a surface of an annular recess formed in socket sleeve member 140.

This herein described conduit connector 130, similar to inlet connector members 100, effectively isolates or seals the outlet flow path 160, formed within the conduit connection 130, from inlet passageway 16 and, simultaneously, compensates for longitudinal relative movement of the inner shell 12 and outer shell 14 and any lateral shifting of the relative positions of the inner and outer shells. The longitudinal relative movement of inner and outer shells 12 and 14 is allowed by sleeve 132 longitudinally sliding within ring 158 while relative radial movement is permitted without disruption of the seal by slidable movement of rings 156 and 158 in their associated recesses in socket sleeve members 138 and 140, respectively.

The conduit connector 170 is of similar construction as conduit connector 130 and therefore will not be described in detail therein. This connector 170 connects a separator (not shown) with a trickle valve assembly 172 which is supported within reaction zone 50 by support 174 and conduit connector 170. The trickle valve assembly 172 is of conventional construction and functions to return solid particulates, separated from the products of combustion leaving reaction zone 50, to the reaction zone. The conduit connector 170 functions, in a manner like conduit connector 130 and connector members 100, to maintain the interior flow area of conduit connector 170 out of communication with inlet passageway 16 during relative expansion and contraction of inner and outer shells 12 and 14 in longitudinal, as well as, radial directions.

The removal of solids, such as ash, from reaction zone 50 is accomplished by an outlet pipe 180. This pipe 180 is connected to manifold partitions 58, 60 and 66 and head portion 22 of outer shell 14 and has a bellows section 182 to allow for relative movement between head portion 22 and partition 58, 60 and 66.

It is believed now readily apparent from the foregoing description that the present invention provides an improved fluidized bed reactor of the type having dual shells forming therebetween a gaseous fluid inlet passageway wherein internal valves are provided for modulating flow of gaseous fluid from the inlet passageway into the two manifolds for distribution into the reaction zone for fluidization of particulate solids and a heat exchanger for controlling reaction temperature in the reaction zone. It is also a fluidized bed reactor having connectors for introducing particulate solids into the reaction zone and removal of gaseous reaction products from the reaction zone which connectors keep the gaseous fluid inlet passageway out of communication with the reaction zone or ambient area exterior of the reactor during differential expansion and contraction of the inner and outer shells. The latter features insure that the gaseous fluid, as for example, compressed air, does not leak into the reaction zone or exteriorly of the reactor and thus bypass the manifolds.

Although but one embodiment of the invention has been shown and described in detail, it is to be expressly understood that the invention is not limited thereto. Various changes can be made in the arrangement of parts without departing from the scope and spirit of the invention, as the same will now be understood by those skilled in the art.

What is claimed is:

1. In a fluidized bed reactor having inner and outer spaced shells to define therebetween a gaseous fluid inlet passageway for receiving and conducting a gaseous fluid from a source thereof remote from the reactor, a distribution partition having a fluid distributing means to divide the inner shell into a reaction zone and an outlet chamber, a heat exchanger in the reaction zone for conducting gaseous fluid therethrough for the absorption of heat from the reaction zone, inlet connector means for passing particulate materials into the reaction zone for reaction with said gaseous fluid, and outlet connector means for passing products of the reaction from the reaction zone, the improvement comprising
  (a) partition means cooperating with the distribution partition to form first and second inlet manifolds;
  (b) said first manifold being in communication with said inlet passageway to receive one portion of gaseous fluid therefrom for passage into the reaction zone through said fluid distributing means;
  (c) said second manifold being in communication with said inlet passageway to receive from the latter another portion of said gaseous fluid for passage into said heat exchanger; and
  (d) valve means within the reactor for modulating the flow of gaseous fluid from said inlet passageway to said first manifold and said second manifold.

2. The apparatus of claim 1 wherein said first and second manifolds are each in communication with said inlet passageway through port means and wherein said valve means includes a valve for each port means.

3. The apparatus of claim 2 wherein said port means is a plurality of circumferentially spaced ports each of which has a valve for controlling gaseous fluid flow through the associated port.

4. The apparatus of claim 1 wherein said inlet connector means includes a plurality of circumferentially spaced connectors each of which extends through aligned openings in said inner and outer shells and wherein each inlet connector has engaging means for sealingly contacting the inner and the outer shells and allowing relative expansion and contraction of the inner and outer shells while maintaining sealing engagement and isolation of the inlet passageway from the associated aligned openings.

5. The apparatus of claim 4 wherein said engaging means comprises a sleeve and axially spaced first rings on said sleeve, each of said first rings having an arcuate peripheral surface, and a second ring for each of said first rings and so disposed relative to the aligned openings and connected to the adjacent inner and outer shells to provide said sealing contact, each of said second rings having an arcuate inner peripheral surface abutting and complementary to that of its associated first ring to effect sliding seal.

6. The apparatus of claim 1 wherein said outlet connector means comprises a sleeve extending through aligned openings in the inner and outer shells and the inlet passageway, a first annular surface portion around said sleeve adjacent each of said aligned openings, a second annular surface portion at each of said aligned openings abutting said first annular surface portion in sealing relationship, and said first and second annular surface portions being so formed as to allow relative movement between the inner and outer shells without disrupting the sealing abutment of those surfaces.

7. The apparatus of claim 6 wherein one of said first annular surface portions is found on an annular member separate and apart from the sleeve and wherein said sleeve is permitted to axially move relative to said annular member.

8. A fluidized bed reactor vessel of the type wherein one portion of a gaseous fluid is conducted into the reactor vessel for reaction therein and another portion of the gaseous fluid is used to indirectly absorb heat from the reaction comprising:
  (a) an outer shell and an inner shell spaced from the outer shell to define therebetween a supply passageway;
  (b) an inlet connection for conducting the gaseous fluid from a source thereof into said supply passageway;
  (c) a transversely extending first manifold in said inner shell to divide the latter into a reaction chamber and an outlet chamber;
  (d) a second manifold in said inner shell;
  (e) a heat exchanger having tubes one end of which communicates with the second manifold and the other end of which communicates with said outlet chamber to receive said another portion of the gaseous fluid and conduct the same through said heat exchanger tubes to said outlet chamber;
  (f) first passage means communicating the supply passageway with said first manifold;
  (g) second passage means communicating the supply passageway with said second manifold;
  (h) valve means in each of said first and second passage means for controlling flow of gaseous fluid from said supply passageway into said first and second manifolds so that one portion of said gaseous fluid flows into the first manifold and said another portion of the gaseous fluid flows into the second manifold;
  (i) inlet means for passing reactant material from a source thereof into the reaction chamber;
  (j) an outlet means for conducting products of the reaction from the reaction chamber; and
  (k) a heated gaseous fluid outlet connection for passing heated said another portion of the gaseous fluid from the outlet chamber.

9. The apparatus of claim 8 wherein said second passage means comprises a plurality of circumferentially spaced openings in the inner shell and said valve means comprises a plurality of valves, one for each opening, to control flow of gaseous fluid therethrough.

10. The apparatus of claim 8 wherein said inlet means for passing reactant materials into the reaction chamber includes a plurality of circumferentially spaced connectors, each of which extends though aligned openings in said inner and outer shells and wherein each connector has engaging means for sealingly engaging the inner and outer shells adjacent said openings therein and adjusting to relative expansion and contraction between the inner and outer shells while maintaining sealing engagement therewith.

11. A fluidized bed reactor vessel of the type wherein one portion of a gaseous fluid is conducted into a reactor vessel for reaction therein and another portion of the gaseous fluid is used to indirectly absorb heat to maintain the reaction temperature within the vessel below a predetermined temperature value comprising:
  (a) an outer shell having a supply inlet connection for connection to a source of said gaseous fluid;
  (b) an inner shell spaced from the outer shell to form therebetween a gaseous fluid inlet passageway communicating with said supply inlet connection for receiving gaseous fluid from the latter;
  (c) a first partition means extending transversely of the inner shell and connected to the latter to form a first inlet manifold for said one portion of gaseous fluid, and dividing the interior of the inner shell into a reaction chamber and an outlet chamber;
  (d) a second partition means extending transversely of the inner vessel and spaced from said first partition means to form a second inlet manifold for said another portion of the gaseous fluid;

(e) a bank of heat exchanger tubes disposed in the reaction chamber;

(f) each tube of said bank of tubes being in communication at one end with the second inlet manifold and at the opposite end with the outlet chamber to thereby provide for flow of said another portion of the gaseous fluid flow therethrough.

(g) a plurality of circumferentially spaced conduit means in said first inlet manifold, each of which communicates at one end through a first inlet opening in the shell with said gaseous fluid inlet passageway and at the opposite end with the second inlet manifold to conduct said gaseous fluid from the inlet passageway to said second inlet manifold;

(h) a plurality of circumferentially spaced second inlet openings in said inner shell to communicate said inlet passageway with said first inlet manifold to conduct said one portion of gaseous fluid to the latter;

(i) distribution means coacting with first partition means for distributing and passing said one portion of the gaseous fluid from said first manifold into the reaction chamber;

(j) valve means for each of said first and second inlet openings for controlling flow through each of the associated openings to regulate the distribution of flow between the first and second manifolds;

(k) material supply inlet means for passing material into the reaction chamber for reaction with said gaseous fluid;

(l) an outlet means for conducting products of the reaction from the reaction chamber; and (m) a heated gaseous fluid outlet connection for passing heated gaseous fluid from the outlet chamber.

12. The apparatus of claim 11 wherein said valve means comprises a movable valve member actuable between a seated position sealing the associated inlet opening and a fully open position for maximum gaseous fluid flow through the associated opening, and actuation means connected to the movable valve member extending outside of said outer vessel for effecting movement of the valve member.

13. The apparatus of claim 11 wherein said material supply inlet means includes a plurality of circumferentially spaced connectors each of which extends through aligned openings in said inner and outer shells and wherein each connector has engaging means for sealingly engaging the inner and outer shells and allowing relative expansion and contraction between the inner and outer shells while maintaining sealing engagment therewith and isolation of the inlet passageway from the aligned openings.

14. The apparatus of claim 13 wherein said engaging means for each inlet means comprises a sleeve extending in said aligned openings and across said inlet passageway, a pair of collars spaced axially on and embracing said sleeve, each collar having an arcuate outer peripheral surface in axial cross-section, a pair of socket members one for each collar and having an inner surface complementary to and abutting the outer surface of its associated collar, each one of said pair of socket members being so disposed relative to one of the aligned openings and connected to the associated shell to provide said sealing engagement.

15. The apparatus of claim 13 wherein one of said pair of collars is secured to the sleeve and the other is axially slidable relative to the sleeve.

* * * * *